United States Patent
Farkash et al.

(10) Patent No.: US 10,148,423 B2
(45) Date of Patent: Dec. 4, 2018

(54) DATA SECURITY SYSTEM WITH IDENTIFIABLE FORMAT-PRESERVING ENCRYPTION

(71) Applicant: International Business Machines Corporation, Armonk, NY (US)

(72) Inventors: Ariel Farkash, Shimshit (IL); Abigail Goldsteen, Haifa (IL); Micha Moffie, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 14/803,113

(22) Filed: Jul. 20, 2015

(65) Prior Publication Data

US 2017/0026170 A1    Jan. 26, 2017

(51) Int. Cl.
  *H04L 9/06* (2006.01)
  *G06F 21/60* (2013.01)
  *G06F 21/62* (2013.01)

(52) U.S. Cl.
  CPC .......... *H04L 9/0618* (2013.01); *G06F 21/602* (2013.01); *G06F 21/6209* (2013.01); *G06F 2221/2107* (2013.01)

(58) Field of Classification Search
  CPC . H04L 9/0618; G06F 21/602; G06F 21/6209; G06F 2221/2107
  USPC .......................................................... 380/28
  See application file for complete search history.

(56) References Cited

U.S. PATENT DOCUMENTS

| 8,566,601 | B1* | 10/2013 | Waters | H04L 9/3073 380/30 |
| 8,744,076 | B2* | 6/2014 | Youn | H04L 9/002 380/28 |
| 2002/0048364 | A1* | 4/2002 | Gligor | H04L 9/0637 380/37 |
| 2003/0033537 | A1* | 2/2003 | Fujimoto | G06F 21/123 713/193 |
| 2004/0240670 | A1* | 12/2004 | Man | G06F 21/34 380/277 |
| 2006/0210081 | A1* | 9/2006 | Zhu | H04L 9/065 380/277 |
| 2009/0136040 | A1* | 5/2009 | Oishi | H04L 9/3236 380/277 |
| 2010/0185873 | A1* | 7/2010 | Hashimoto | G06F 21/6209 713/189 |
| 2011/0103579 | A1* | 5/2011 | Martin | G06F 21/602 380/28 |
| 2015/0067322 | A1 | 3/2015 | Reddy et al. | |
| 2015/0270965 | A1* | 9/2015 | Fischer | H04L 9/0869 380/28 |

* cited by examiner

Primary Examiner — Matthew T Henning

(57) ABSTRACT

A data security method including creating a token-including plaintext by including a predefined token into a plaintext, generating a cyphertext by encrypting the token-including plaintext using format-preserving encryption, generating a decrypted cyphertext by decrypting an input text, determining whether the decrypted cyphertext includes a first predefined token, if the decrypted cyphertext includes the first predefined token, recreating the plaintext by removing the first predefined token from the decrypted cyphertext, and if the decrypted cyphertext does not include the first predefined token, using the input text as the plaintext.

6 Claims, 6 Drawing Sheets

DATA SECURITY SYSTEM WITH IDENTIFIABLE FORMAT-PRESERVING ENCRYPTION

BACKGROUND

Format-preserving encryption is typically used to encrypt data when it is necessary to maintain the data's format for reasons such as validation. One characteristic of format-preserving encryption is that its encrypted data is visually indistinguishable from unencrypted data of the same format. For example, format-preserving encryption of the email address alice@ibm.com may result in the value kfhsu@dfj.bul, which also looks like a valid email address.

Some applications that access data need to know whether the data are encrypted or not. Where the data are stored in a database, one solution would be to add one or more additional fields to the database to indicate which data are encrypted, although this would incur additional storage overhead. Another possibility would be to add an indicator to the data after it is encrypted, to identify it as such. However, this is not possible where doing so would violate format-preservation requirements.

SUMMARY

In one aspect of the invention a data security method is provided including creating a token-including plaintext by including a predefined token into a plaintext, generating a cyphertext by encrypting the token-including plaintext using format-preserving encryption, generating a decrypted cyphertext by decrypting an input text, determining whether the decrypted cyphertext includes a first predefined token, if the decrypted cyphertext includes the first predefined token, recreating the plaintext by removing the first predefined token from the decrypted cyphertext, and if the decrypted cyphertext does not include the first predefined token, using the input text as the plaintext.

In another aspect of the invention a computer program product is provided for providing data security, the computer program product including a non-transitory, computer-readable storage medium, and computer-readable program code embodied in the storage medium, where the computer-readable program code is configured to create a token-including plaintext by including a predefined token into a plaintext, generate a cyphertext by encrypting the token-including plaintext using format-preserving encryption, generate a decrypted cyphertext by decrypting an input text, determine whether the decrypted cyphertext includes a first predefined token, if the decrypted cyphertext includes the first predefined token, recreate the plaintext by removing the first predefined token from the decrypted cyphertext, and if the decrypted cyphertext does not include the first predefined token, use the input text as the plaintext.

In other aspects of the invention systems embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1A:
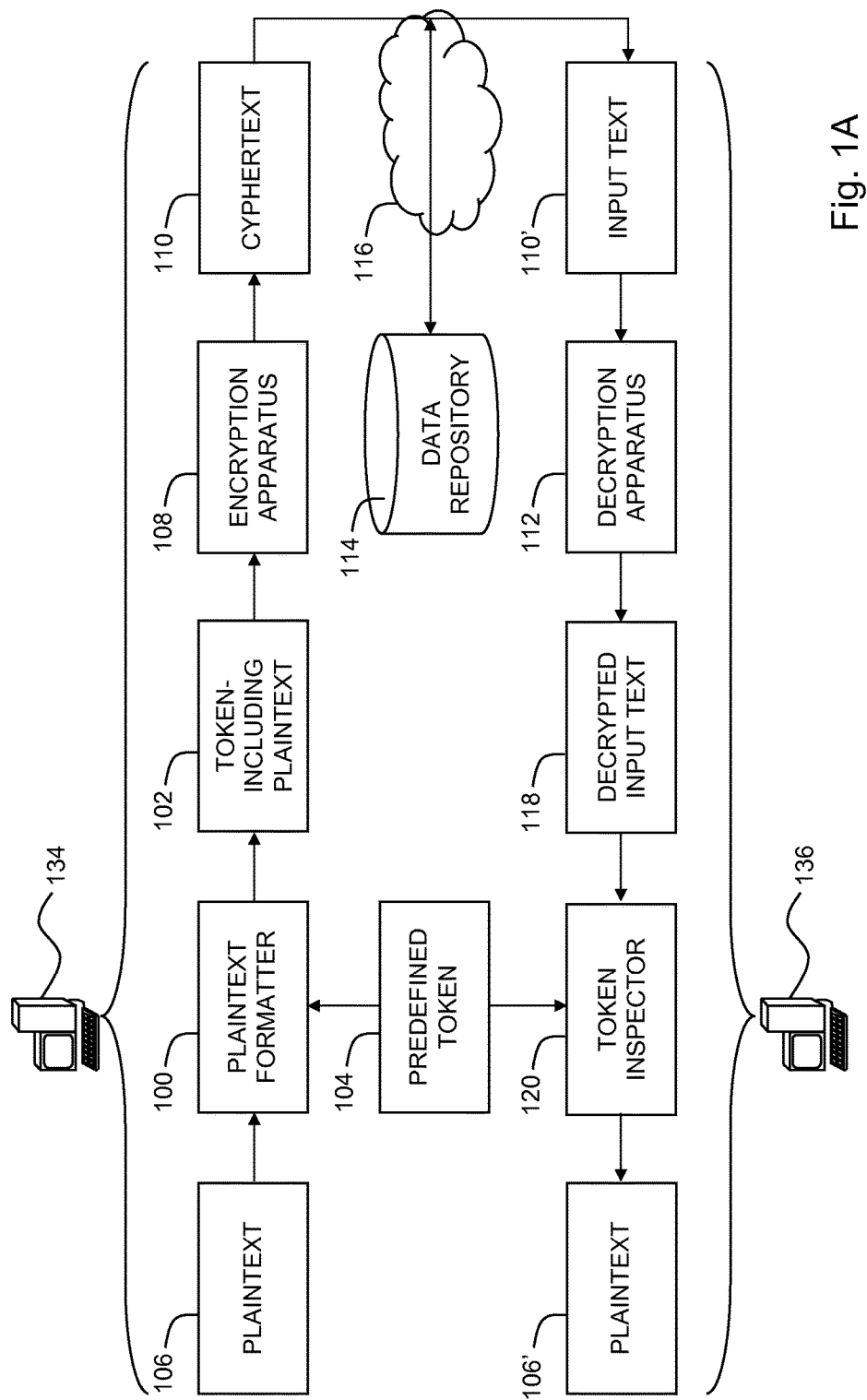
FIG. 1A is a simplified conceptual illustration of a data security system with format-preserving encryption, constructed and operative in accordance with an embodiment of the invention.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1A, which is a simplified conceptual illustration of a data security system with format-preserving encryption, constructed and operative in accordance with an embodiment of the invention. In the system of FIG. 1A, a plaintext formatter 100 creates a token-including plaintext 102 by including a predefined token 104, such as "token_", into a plaintext 106, such that token-including plaintext 102 complies with any format requirements that are applicable to plaintext 106 (e.g., a legal email address format). Encryption apparatus 108 generates a cyphertext 110 by encrypting token-including plaintext 102 using any format-preserving encryption method.

Decryption apparatus 112 processes an input text 110', which may be cyphertext 110 or another text that has not been encrypted, such as may be stored in a data repository 114 that is accessible via a computer network 116, such as the Internet, and retrieved therefrom or otherwise received by decryption apparatus 112. Decryption apparatus 112 generates a decrypted input text 118 by decrypting input text 110' using any decryption method that can decrypt data encrypted using whichever format-preserving encryption method was used by encryption apparatus 108 to generate cyphertext 110.

A token inspector 120 determines whether decrypted input text 118 includes predefined token 104. If decrypted input text 118 includes predefined token 104, token inspector 120 recreates plaintext 106 as plaintext 106' by removing predefined token 104 from decrypted input text 118. If decrypted input text 118 does not include predefined token 104, token inspector 120 uses input text 110' as plaintext 106'.

Operation of the system of FIG. 1A at various stages may be illustrated by the following examples:

|  | Example 1 | Example 2 |
| --- | --- | --- |
| Plaintext 106 | alice@ibm.com |  |
| Token-including plaintext 102 | token_alice@ibm.com |  |
| Cyphertext 110 | dgsdgfsdg@lsn.kjg |  |
| Input text 110' | dgsdgfsdg@lsn.kjg | bob@ibm.com |
| Decrypted input text 118 | token_alice@ibm.com | rtjorujkj@pfg.erd |
| Plaintext 106' | alice@ibm.com | bob@ibm.com |

Figure 1B:
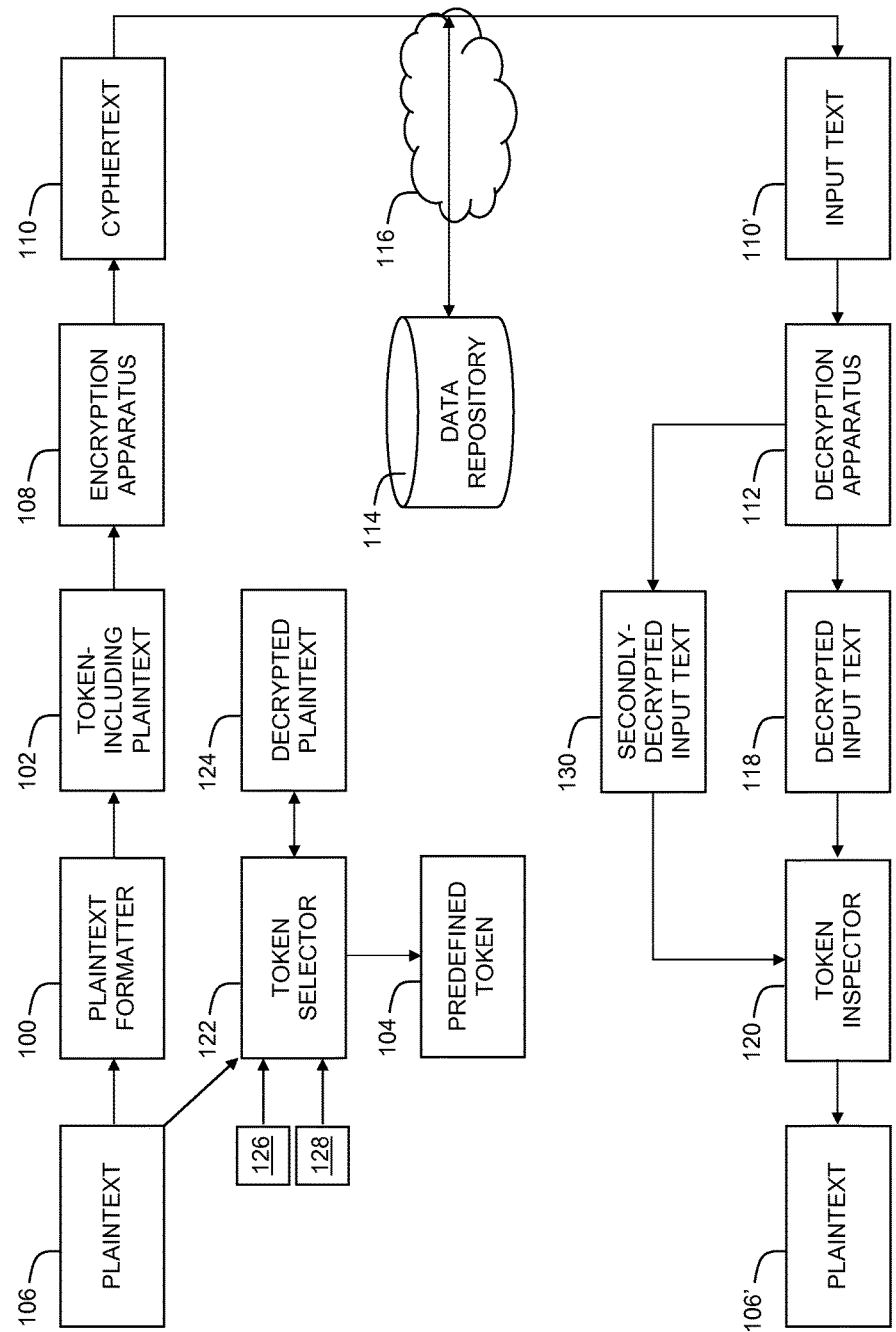
FIG. 1B is a simplified conceptual illustration of a data security system with format-preserving encryption, constructed and operative in accordance with another embodiment of the invention.

Additional reference is now made to FIG. 1B, which is a simplified conceptual illustration of a data security system with format-preserving encryption, constructed and operative in accordance with another embodiment of the invention. The system of FIG. 1B includes the elements of the system of 1A as described above (although some elements are not shown in FIG. 1B to avoid crowding), as well as a token selector 122 that generates a decrypted plaintext 124 by decrypting plaintext 106 and determines if decrypted plaintext 124 includes a first token candidate 126, such as "token_". If decrypted plaintext 124 does not include first token candidate 126, token selector 122 causes plaintext formatter 100 to use first token candidate 126 as predefined token 104. If decrypted plaintext 124 includes first token candidate 126, token selector 122 causes plaintext formatter 100 to use a second token candidate 128, such as "shmoken_", as predefined token 104.

In FIG. 1B, token inspector 120 determines whether decrypted input text 118 includes first token candidate 126 or second token candidate 128. If decrypted input text 118 does not include first token candidate 126 or second token candidate 128, token inspector 120 uses input text 110' as plaintext 106'. If decrypted input text 118 includes first token candidate 126, token inspector 120 recreates plaintext 106 as plaintext 106' by removing first token candidate 126 from decrypted input text 118. If decrypted input text 118 includes second token candidate 128, token inspector 120 causes decryption apparatus 112 to generate a secondly-decrypted input text 130 by decrypting decrypted input text 118 without second token candidate 128. If secondly-decrypted input text 130 does not include first token candidate 126, token inspector 120 uses input text 110' as plaintext 106'. If secondly-decrypted input text 130 includes first token candidate 126, token inspector 120 recreates plaintext 106 plaintext 106' by removing second token candidate 128 from decrypted input text 118.

Operation of the system of FIG. 1B at various stages may be illustrated by the following examples:

|  | Example 1 | Example 2 |
|---|---|---|
| Plaintext 106 | alice@ibm.com |  |
| Decrypted plaintext 124 | fddsf@jhk.nbv |  |
| Token-including plaintext 102 | token_alice@ibm.com |  |
| Cyphertext 110 | dgsdgfsdg@lsn.kjg |  |
| Input text 110' | dgsdgfsdg@lsn.kjg | bob@ibm.com |
| Decrypted input text 118 | token_alice@ibm.com | rtjorujkj@pfg.erd |
| Plaintext 106' | alice@ibm.com | bob@ibm.com |

|  | Example 3 | Example 4 |
|---|---|---|
| Plaintext 106 | charles@ibm.com |  |
| Decrypted plaintext 124 | token_fddsf@jhk.nbv |  |
| Token-including plaintext 102 | shmoken_charles@ibm.com |  |
| Cyphertext 110 | erwerwerwer@plm.cvx |  |
| Input text 110' | erwerwerwer@plm.cvx | jack.daniels@ibm.com |
| Decrypted input text 118 | shmoken_charles@ibm.com | shmoken_faud.mrrwet@wsa.cfd |
| Secondly-decrypted input text 130 | token_fddsf@jhk.nbv | hrta.brta@dfs.vrd |
| Plaintext 106' | charles@ibm.com | jack.daniels@ibm.com |

Any of the elements shown in FIGS. 1A and 1B are preferably implemented by one or more computers, such as computers 134 and 136, in computer hardware in computer hardware and/or in computer software embodied in a non-transitory, computer-readable medium in accordance with conventional techniques.

Figure 2A:
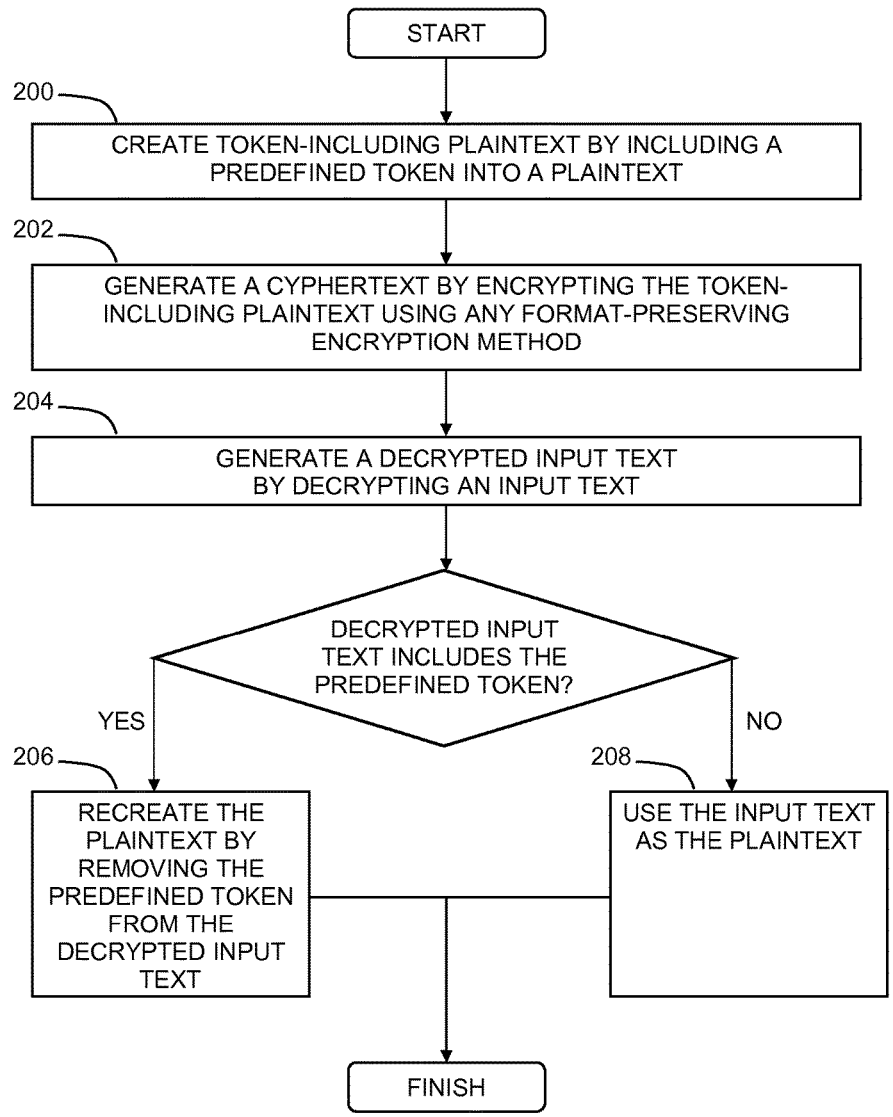
FIG. 2A is a simplified flowchart illustration of an exemplary method of operation of the system of FIG. 1A, operative in accordance with an embodiment of the invention.

Reference is now made to FIG. 2A which is a simplified flowchart illustration of an exemplary method of operation of the system of FIG. 1A, operative in accordance with an embodiment of the invention. In the method of FIG. 2A a token-including plaintext is created by including a predefined token, such as "token_", into a plaintext (step 200). A cyphertext is generated by encrypting the token-including plaintext using any format-preserving encryption method (step 202). A decrypted input text is generated by decrypting an input text, which may be the cyphertext or another text that has not been encrypted, using any decryption method that can decrypt data encrypted using whichever format-preserving encryption method was used to generate the cyphertext (step 204). If the decrypted input text includes the predefined token, the plaintext is recreated by removing the predefined token from the decrypted input text (step 206). If the decrypted input text does not include the predefined token, the input text is used as the plaintext (step 208).

Figure 2B:
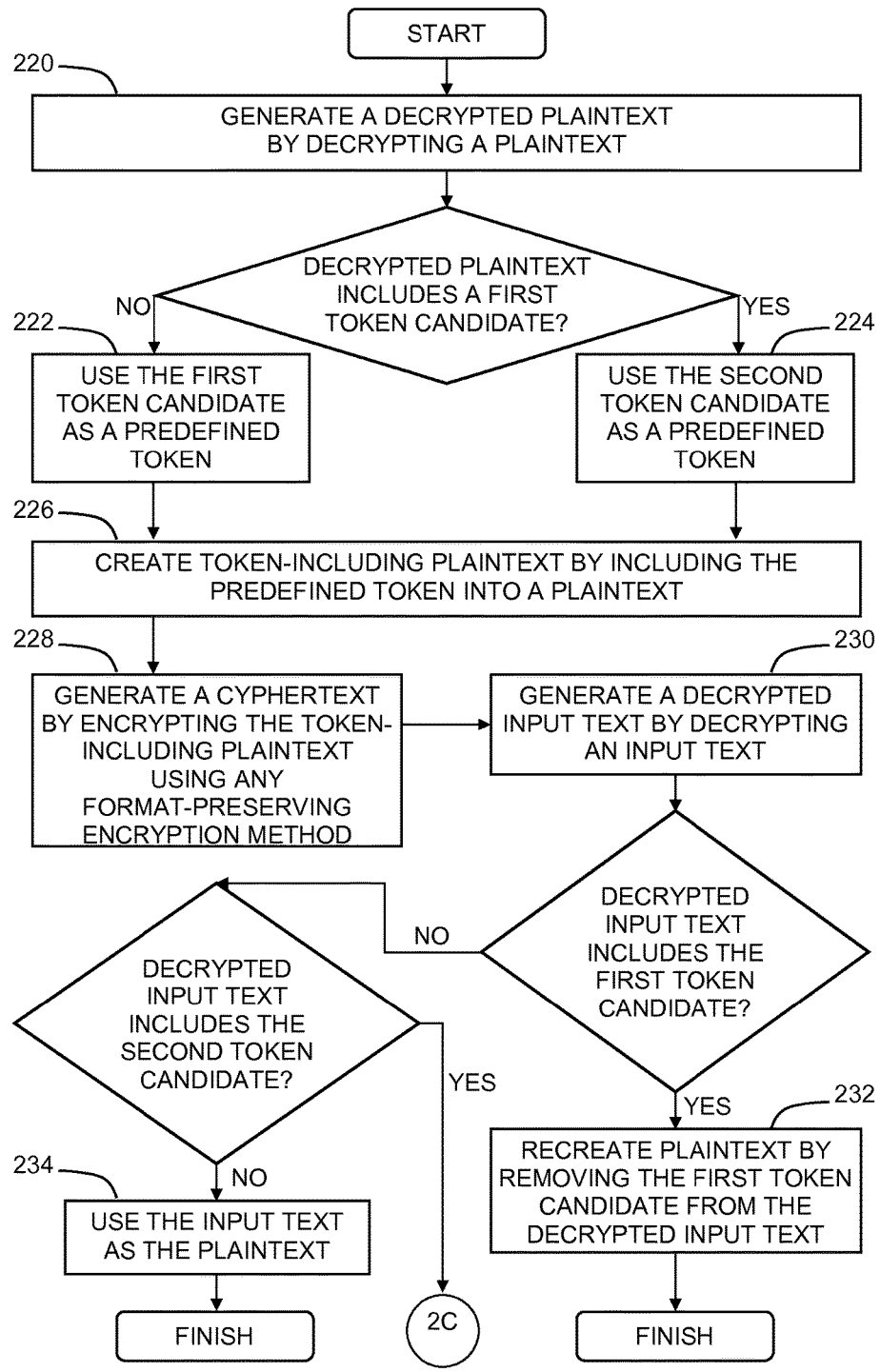
FIGS. 2B and 2C, taken together, is a simplified flowchart illustration of an exemplary method of operation of the system of FIG. 1B, operative in accordance with an embodiment of the invention.
Figure 2C:
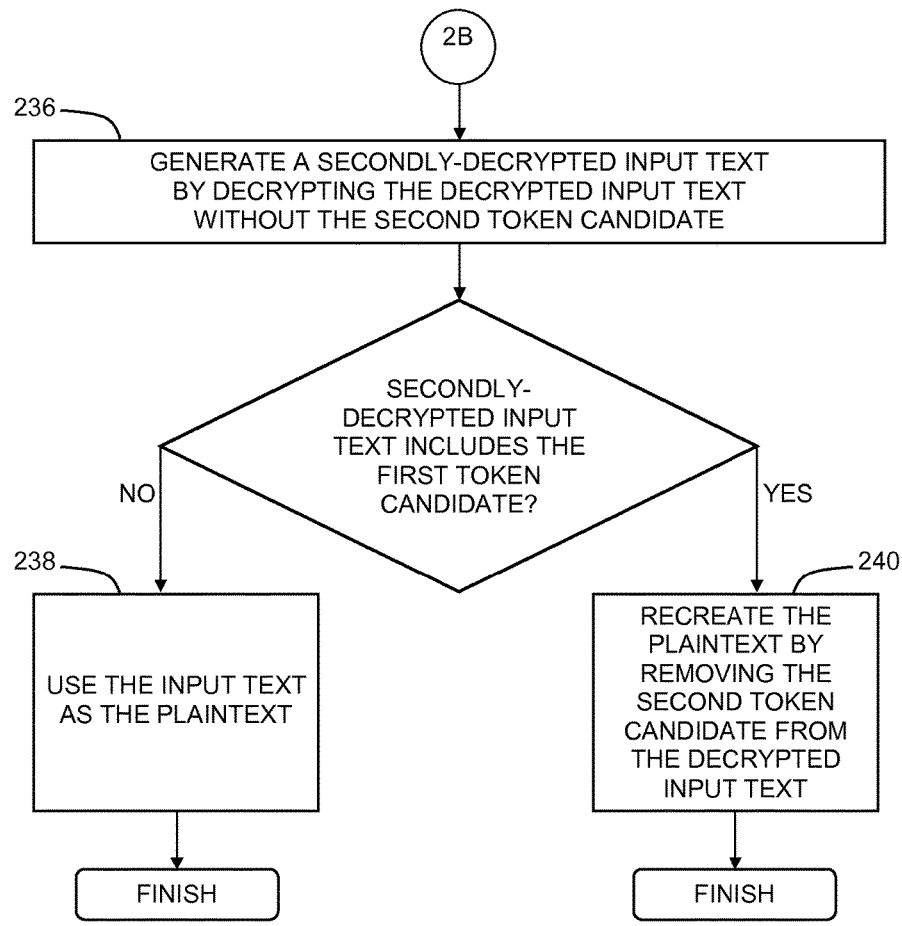

Additional reference is now made to FIGS. 2B and 2C which, taken together, is a simplified flowchart illustration of an exemplary method of operation of the system of FIG. 1B, operative in accordance with an embodiment of the invention. In the method of FIGS. 2B and 2C, a decrypted plaintext is generated by decrypting a plaintext using any decryption method that can decrypt data encrypted using whichever format-preserving encryption method will be used to generate a cyphertext (step 220). If the decrypted plaintext does not include a first token candidate, such as "token_", the first token candidate is selected for use as a predefined token (step 222). If the decrypted plaintext includes the first token candidate, a second token candidate, such as "shmoken_", is selected for use as a predefined token (step 224). A token-including plaintext is created by including the predefined token into a plaintext (step 226). A cyphertext is generated by encrypting the token-including plaintext using any format-preserving encryption method (step 228). A decrypted input text is generated by decrypting an input text, which may be the cyphertext or another text that has not been encrypted, using any decryption method that can decrypt data encrypted using whichever format-preserving encryption method was used to generate the cyphertext (step 230). If the decrypted input text includes the first token candidate, the plaintext is recreated by removing the first token candidate from the decrypted input text (step 232). If the decrypted input text does not include the first token candidate or the second token candidate, the input text is used as the plaintext (step 234). If the decrypted input text includes the second token candidate, a secondly-decrypted input text is generated by decrypting the decrypted input text without the second token candidate (step 236). If the secondly-decrypted input text does not include the first token candidate, the input text is used as the plaintext (step 238). If the secondly-decrypted input text includes the first token candidate, the plaintext is recreated by removing the second token candidate from the decrypted input text (step 240).

The invention as described herein thus allows for an input text to be identified as encrypted or unencrypted, particularly where the input text is encrypted using format-preserving encryption.

Figure 3:
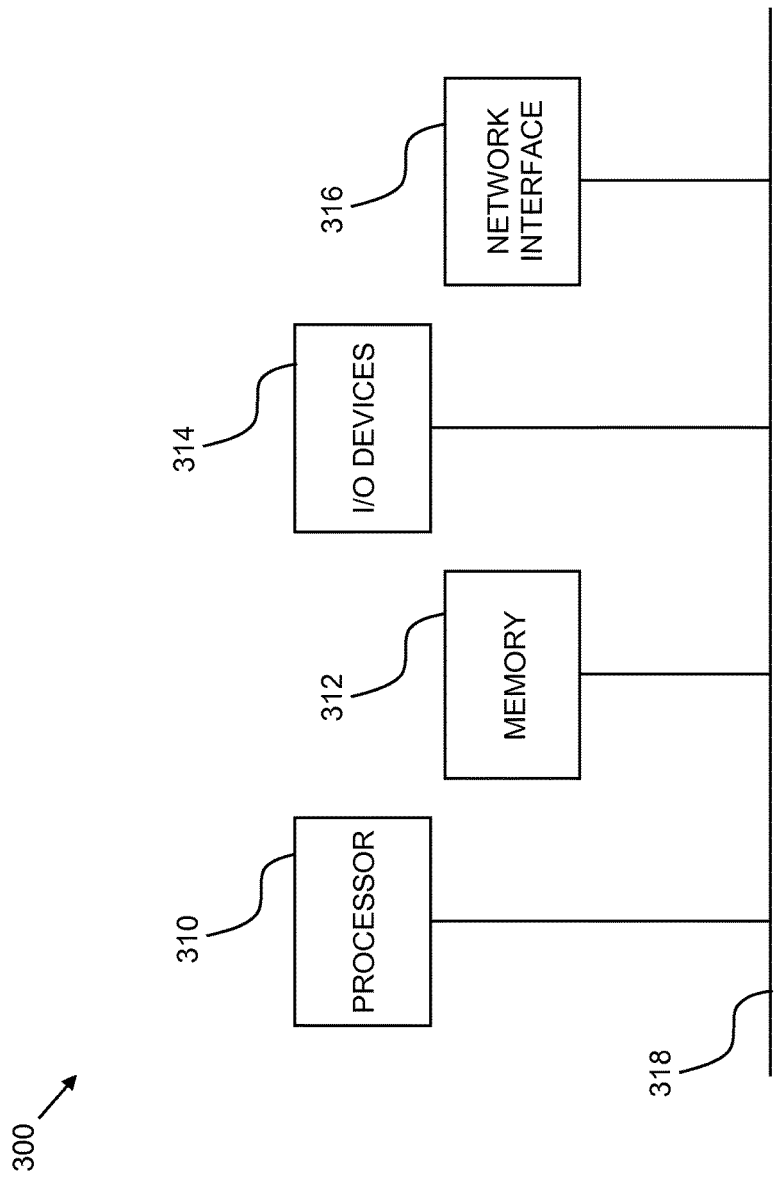
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2C) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data security method comprising:
generating, using token selection apparatus, a decrypted plaintext by decrypting a plaintext;
determining, using the token selection apparatus, if the decrypted plaintext includes a first token candidate;
if the decrypted plaintext does not include the first token candidate, using the token selection apparatus to designate the first token candidate as a predefined token;
if the decrypted plaintext includes the first token candidate, using the token selection apparatus to designate a second token candidate as the predefined token;
creating, using plaintext formatting apparatus, a token-including plaintext by including the predefined token into the plaintext; and
generating, using encryption apparatus, a cyphertext by encrypting the token-including plaintext using format-preserving encryption.

2. The method according to claim 1 and further comprising providing an input text to apparatus configured to:
generate a decrypted cyphertext by decrypting the input text,
determine whether the decrypted cyphertext includes the first token candidate or the second token candidate,
if the decrypted cyphertext does not include the first token candidate or the second token candidate, use the input text as the plaintext,
if the decrypted cyphertext includes the first token candidate, recreate the plaintext by removing the first token candidate from the decrypted cyphertext, and
if the decrypted cyphertext includes the second token candidate,
generate a secondly-decrypted cyphertext by decrypting the decrypted cyphertext without the second token candidate,
if the secondly-decrypted cyphertext does not include the first token candidate, use the input text as the plaintext, and
if the secondly-decrypted cyphertext includes the first token candidate, recreate the plaintext by removing the second token candidate from the decrypted cyphertext,
wherein the input text is one of
a) the cyphertext generated from the token-including plaintext, and
b) a text that has not been encrypted.

3. A data security method comprising:
generating, using decryption apparatus, a decrypted cyphertext by decrypting an input text;
determining, using token inspection apparatus, whether the decrypted cyphertext includes a first predefined token or a second predefined token;
if the decrypted cyphertext includes the first predefined token, recreating the plaintext using the token inspection apparatus by removing the first predefined token from the decrypted cyphertext;
if the decrypted cyphertext does not include the first predefined token or the second predefined token, using the input text as the plaintext with the token inspection apparatus;
if the decrypted cyphertext includes the second predefined token, generating, using the decryption apparatus, a secondly-decrypted cyphertext by decrypting the decrypted cyphertext without the second predefined token;
if the secondly-decrypted cyphertext does not include the first predefined token, using the input text as the plaintext with the token inspection apparatus; and
if the secondly-decrypted cyphertext includes the first predefined token, recreating the plaintext using the token inspection apparatus by removing the second predefined token from the decrypted cyphertext.

4. A data security system comprising:
token selection apparatus configured to
generate a decrypted plaintext by decrypting a plaintext,
determine if the decrypted plaintext includes a first token candidate,
if the decrypted plaintext does not include the first token candidate, designate the first token candidate as a predefined token,
if the decrypted plaintext includes the first token candidate, designate a second token candidate as the predefined token;
plaintext formatting apparatus configured to create a token-including plaintext by including the predefined token into the plaintext; and encryption apparatus configured to generate a cyphertext by encrypting the token-including plaintext using format-preserving encryption.

5. The system according to claim 4 and further comprising:
decryption apparatus configured to generate a decrypted cyphertext by decrypting an input text; and
a token inspector configured to
determine whether the decrypted cyphertext includes the first token candidate or the second token candidate,
if the decrypted cyphertext does not include the first token candidate or the second token candidate, use the input text as the plaintext,
if the decrypted cyphertext includes the first token candidate, recreate the plaintext by removing the first token candidate from the decrypted cyphertext, and
if the decrypted cyphertext includes the second token candidate,
cause the decryption apparatus to generate a secondly-decrypted cyphertext by decrypting the decrypted cyphertext without the second token candidate,
if the secondly-decrypted cyphertext does not include the first token candidate, use the input text as the plaintext, and
if the secondly-decrypted cyphertext includes the first token candidate, recreate the plaintext by removing the second token candidate from the decrypted cyphertext,
wherein the input text is one of
a) the cyphertext generated from the token-including plaintext, and
b) a text that has not been encrypted.

6. A data security system comprising:
decryption apparatus configured to generate a decrypted cyphertext by decrypting an input text; and
a token inspector configured to
determine whether the decrypted cyphertext includes the first predefined token or a second predefined token,
if the decrypted cyphertext includes the first predefined token, recreate the plaintext by removing the first predefined token from the decrypted cyphertext,
if the decrypted cyphertext does not include the first predefined token or the second predefined token, use the input text as the plaintext, and
if the decrypted cyphertext includes the second predefined token,
cause the decryption apparatus to generate a secondly-decrypted cyphertext by decrypting the decrypted cyphertext without the second predefined token,
if the secondly-decrypted cyphertext does not include the first predefined token, use the input text as the plaintext, and
if the secondly-decrypted cyphertext includes the first predefined token, recreate the plaintext by removing the second predefined token from the decrypted cyphertext.

* * * * *